(12) United States Patent
Herman et al.

(10) Patent No.: US 8,749,588 B2
(45) Date of Patent: Jun. 10, 2014

(54) POSITIONING LABELS IN AN ENGINEERING DRAWING

(75) Inventors: Glen A. Herman, Olathe, KS (US); Karl Kristofer Beal, Kansas City, MO (US)

(73) Assignee: HNTB Holdings, Ltd., Kansas City, MO (US)

( * ) Notice: Subject to any disclaimer, the term of this patent is extended or adjusted under 35 U.S.C. 154(b) by 599 days.

(21) Appl. No.: 12/559,725

(22) Filed: Sep. 15, 2009

(65) Prior Publication Data
US 2011/0063328 A1    Mar. 17, 2011

(51) Int. Cl.
*G09G 5/00*    (2006.01)

(52) U.S. Cl.
USPC .............................. 345/681; 345/629; 345/635

(58) Field of Classification Search
None
See application file for complete search history.

(56) References Cited

U.S. PATENT DOCUMENTS

| | | | |
|---|---|---|---|
| 5,572,639 A * | 11/1996 | Gantt | 345/651 |
| 5,724,072 A * | 3/1998 | Freeman et al. | 345/648 |
| 5,988,853 A * | 11/1999 | Kim et al. | 700/90 |
| 6,091,424 A | 7/2000 | Madden et al. | |
| 6,154,219 A * | 11/2000 | Wiley et al. | 345/587 |
| 6,565,610 B1 * | 5/2003 | Wang et al. | 715/210 |
| 6,904,392 B1 * | 6/2005 | Marty et al. | 703/1 |
| 6,940,530 B2 * | 9/2005 | Chen et al. | 345/660 |
| 7,057,628 B2 * | 6/2006 | Crawford et al. | 345/636 |
| 7,131,060 B1 * | 10/2006 | Azuma | 715/260 |
| 7,644,363 B2 * | 1/2010 | Rogerson et al. | 715/715 |
| 8,482,582 B2 * | 7/2013 | Gelber | 345/629 |
| 2004/0252137 A1 * | 12/2004 | Gelber | 345/629 |
| 2006/0200759 A1 * | 9/2006 | Agrawala et al. | 715/517 |
| 2007/0097148 A1 * | 5/2007 | Tanaka | 345/619 |
| 2007/0240049 A1 * | 10/2007 | Rogerson et al. | 715/700 |
| 2008/0036787 A1 * | 2/2008 | Gelber | 345/619 |
| 2008/0136838 A1 | 6/2008 | Goede et al. | |

OTHER PUBLICATIONS

PCT Notification of Transmittal of the International Search Report and the Written Opinion of the International Searching Authority, or the Declaration, International Application No. PCT/US 10/48355, Date of Mailing: Nov. 5, 2010, International Filing Date: Sep. 10, 2010, Applicant: HNTB Holdings Ltd.

\* cited by examiner

*Primary Examiner* — M Good Johnson
(74) *Attorney, Agent, or Firm* — Shook Hardy & Bacon LLP

(57) ABSTRACT

A computer-readable media for performing a method for displaying information in an engineering drawing. Labels are connected to objects in an engineering drawing. The connections are governed by relationships based on calculations simulating particle interactions and collision avoidance. A change in the position of a first label or of the engineering drawing is indicated. A new location of a second label is calculated such that the relationships between the second label and the engineering drawing and between the first and second labels are maintained, and the second label does not overlap other labels or objects in the engineering drawing. The movement of the second label to the new location may be animated.

18 Claims, 10 Drawing Sheets

POSITIONING LABELS IN AN ENGINEERING DRAWING

SUMMARY

Embodiments of the invention are defined by the claims below, not this Summary. A high-level overview of various aspects of the invention are provided here for that reason, to provide an overview of the disclosure, and to introduce a selection of concepts that are further described below in the Detailed-Description section below. This Summary is not intended to identify key features or essential features of the claimed subject matter, nor is it intended to be used as an aid in isolation to determine the scope of the claimed subject matter.

Embodiments of the invention may be embodied as, among other things: a method or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations useable by a computing device having one or more processors. Media examples include, but are not limited to information-delivery media, random-access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention provide computer-readable media embodied with instructions for displaying information in an engineering drawing such as a computer aided design (CAD) drawing. Labels (which include items such as annotations, dimensions, notes, legends, etc.) are placed on the engineering drawing using our technology. The location of the labels is automatically determined such that the labels do not overlap one another or the engineering drawing. Relationships are provided between the labels and the engineering drawing and between two or more labels to aid in calculating an appropriate location in the engineering drawing for each label. The relationships can be based on analogies such as physics and particle interactions, such as mass-spring, collision avoidance, penalty-based, constraint-based, and impulse-based relationships or interactions. A user provides an indication to change the location of one or more of the labels or to change the position or orientation of the engineering drawing. The relationships between the labels and the engineering drawing are utilized to automatically calculate new locations for the labels and the labels are moved thereto. As such, the labels and the engineering drawing may be moved and the labels relocated so as to not overlap one another or the engineering drawing.

DESCRIPTION OF THE DRAWINGS

Illustrative embodiments of the invention are described in detail below with reference to the attached drawing figures, and wherein.

DETAILED DESCRIPTION

Figure 1:
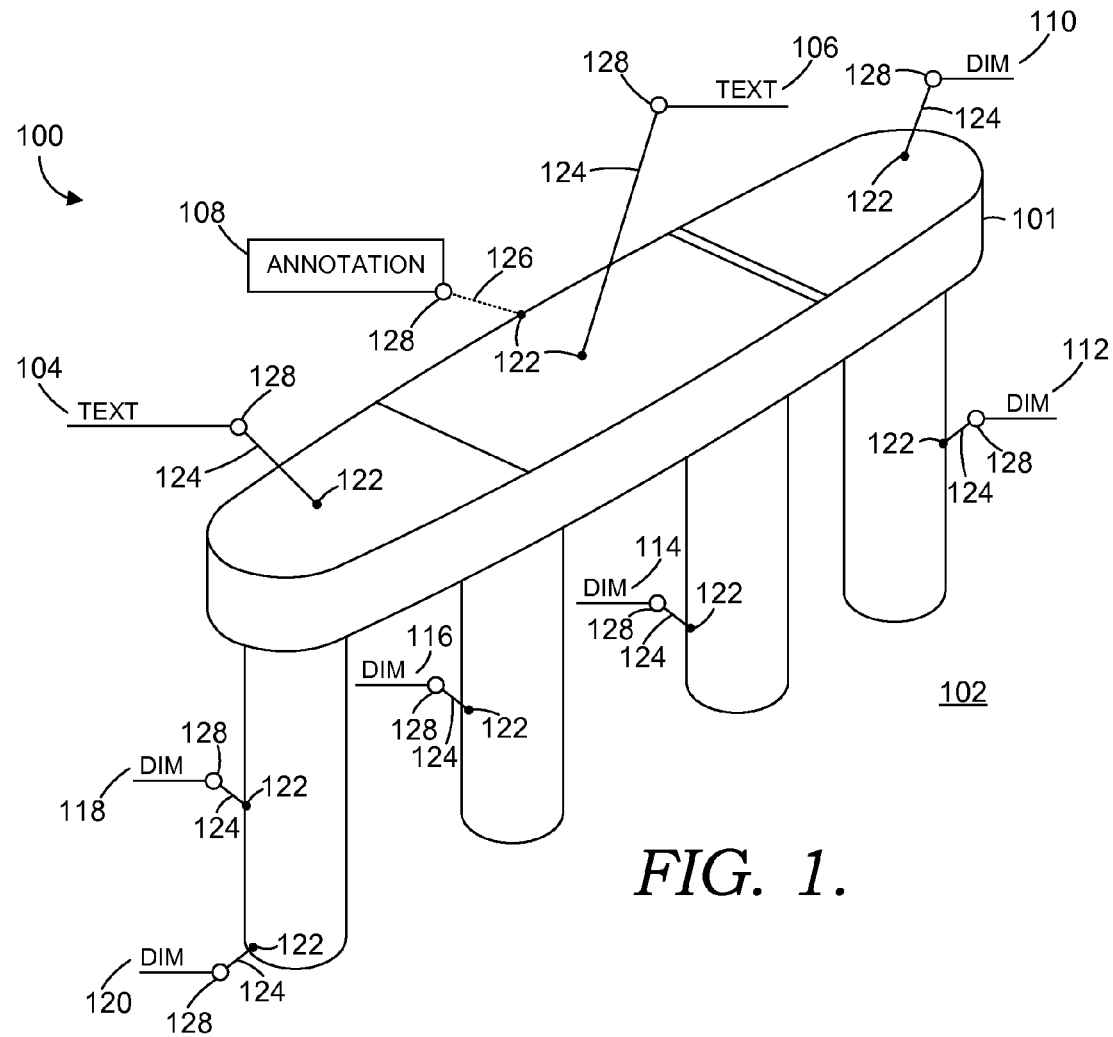
FIG. 1 depicts an illustrative engineering drawing that includes a plurality of labels in accordance with an embodiment of the invention.

Embodiments of the invention are described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention provide computer-readable media for displaying information in an engineering drawing. As used herein, the term engineering drawing includes any drawing created with the aid of a computer, such as by a computer-aided design (CAD) program or other drafting or drawing program, hereinafter referred to as a drafting application. Such engineering drawings may be created for products or structures and are often used to aid in the creation, simulation, planning, construction, maintenance, manufacturing, management, or other aspect of interaction with the product or structure. A structure includes any man-made or natural body such as for example, and not limitation, a building, bridge, tunnel, monument, dam, or landmass. Engineering drawings also include survey layouts and maps created with the aid of a computer and that might indicate topography of a site, and locations of natural and man-made features, among a variety of other data elements.

Computer software applications are known in the art for generating engineering drawings. Such applications include CAD programs such as AutoCad® from Autodesk® of Mill Valley, Calif., Microstation® from Bentley Systems, Inc. of Exton, Pa., or SolidWorks® from Dassault Systemes S.A. of Concord, Mass., among a variety of others.

Consistent with the technology of the invention, engineering drawings can be created with either a two-dimensional or three-dimensional drawing space and utilize any available graphics technology such as raster graphics or vector graphics, among others. In some applications, two-dimensional engineering drawings can be rendered in three dimensions, surfaces can be rendered, drawings can be animated, and the engineering drawing can be manipulated in a three-dimensional drawing space.

Engineering drawings include labels associated with the drawing generally, with a specific portion of the drawing, or with a specific component represented in the drawing. The drawings or graphics created in the drawing space are hereinafter referred to as objects. The labels are displayed with the objects in the engineering drawing to provide information about the engineering drawing or the illustrated components therein. The labels include annotations, notes, callouts, or other engineering information. The labels can describe the drawing or the specific product or structure represented therein. The labels might also include audio, video, or image files that portray or provide additional information to the drawing. For example, a label might include a label indicating dimensions of a component in the drawing, a text box containing an annotation from an engineer indicating that a specific material should be used to produce a product, or an audio file that provides a recorded verbal note for the drawing. The labels can be automatically generated by a drafting application or a user can create labels as desired.

An embodiment of the invention provides computer-readable media having computer-executable instructions embodied thereon that, when executed, perform a method for displaying information in an engineering drawing. An indication of an anchor point that is associated with a label that provides information about an object in an engineering drawing is received. The engineering drawing includes pre-existing labels. A location for the label is determined. The pre-existing labels are moved such that the label and the pre-existing labels do not overlap. The label is inserted at the location.

In another embodiment, computer-readable media having computer-executable instructions embodied thereon that, when executed, facilitate a method of arranging information presented in an engineering drawing is described. An engineering drawing with labels is provided. Each of the labels is associated with a respective anchor point by a respective first mathematical relationship. The labels do not overlap one another. An indication of a change in a position of a first label is received. A first new position is determined for the first label based at least partially on the respective first mathematical relationship between the first label and the respective anchor point and a second mathematical relationship between the first label and a second label. A second new position for the second label is determined based at least partially on the second mathematical relationship between the first label and the second label. The first label is moved to the first new position such that the first label does not overlap any of the other labels. The second label is moved to the second new position.

In another embodiment of the invention, computer-readable media having computer-executable instructions embodied thereon that, when executed, perform a method for displaying information in an engineering drawing are provided. An engineering drawing with labels that are each associated with a respective anchor point by a respective mathematical relationship is provided. The labels do not overlap one another and do not overlap an object in the engineering drawing. A change in a position of an object in the engineering drawing is received. A new position for a first label in the engineering drawing is determined based at least on the respective mathematical relationship. The new position provides a location for the first label at which the first label does not overlap any of the other labels or an object of the engineering drawing. The first label is moved to the new position such that the first label does not overlap any of the other labels.

With reference now to the figures, and to FIGS. 1-4 in particular, images depicting the display of information in an illustrative engineering drawing 100 are described in accordance with embodiments of the invention. As illustrated in FIG. 1, an engineering drawing 100 representing a bridge support structure or pier is provided. As described herein, an engineering drawing 100 includes objects 101 that are comprised of the figures, lines, shapes, symbols, and other graphics that are drawn in a drawing space 102. Embodiments of the invention are discussed herein with respect to engineering drawings 100 of a bridge pier, but such is not intended to limit the subject matter of engineering drawings. Embodiments of the invention are useable with engineering drawings of any subject matter.

In embodiments of the invention, a number of labels 104-120 are generated in relation to the engineering drawing 100. The labels 104-120 provide information about the engineering drawing 100, the objects 101, and the components illustrated thereby. The labels 104-120 are linked or connected to the objects 101 at an anchor point 122. A visible or nonvisible leader 124, 126 extends from the anchor point 122 to a placement node 128 associated with the corresponding label 104-120. In an embodiment, the visible or nonvisible leader 124, 126 extends from the anchor point 122 to a respective label without the use of a placement node 128.

The labels include text labels 104, 106, an annotation label 108, and dimension labels 110-120. In another embodiment, the labels might include any label described above such as, for example and not limitation, annotations, notes, callouts, shortcuts, audio files, video files, and image files. Further, any number of labels can be generated for an engineering drawing 100.

Figure 2:
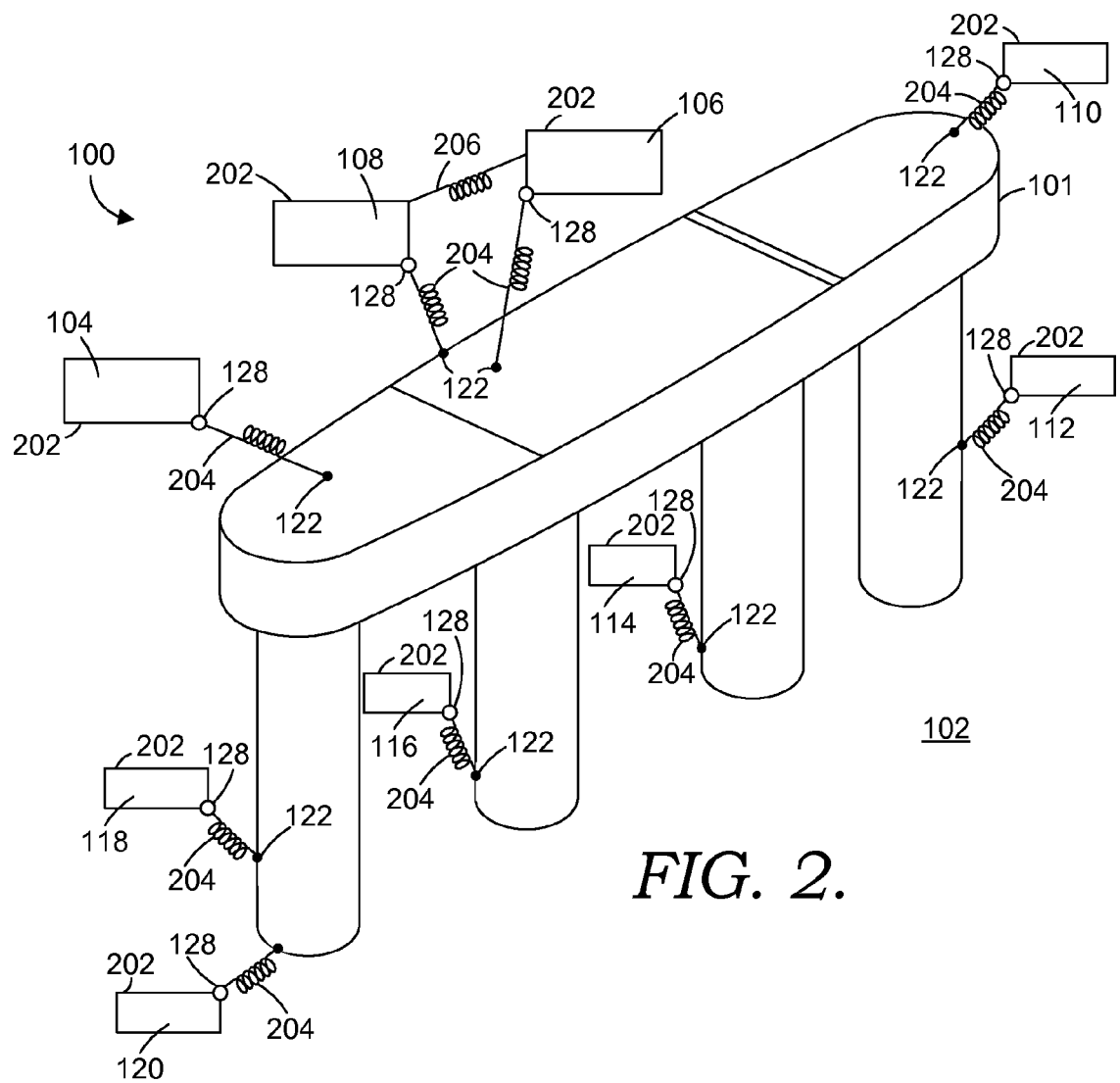
FIG. 2 depicts the illustrative engineering drawing of FIG. 1 that includes label connections in accordance with an embodiment of the invention.
Figure 3:
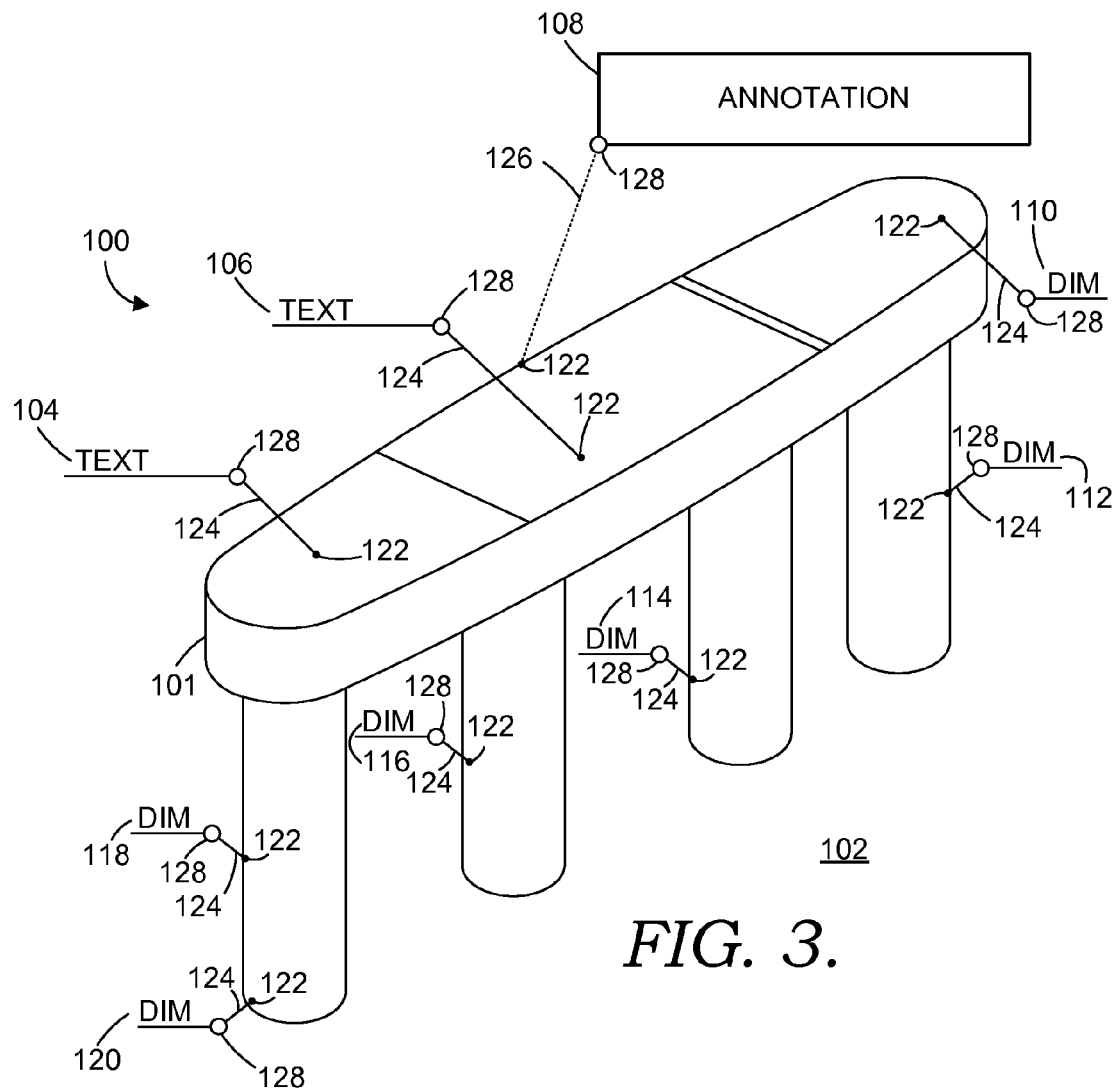
FIG. 3 depicts an illustrative rearrangement of labels that were moved in accordance with an embodiment of the invention.
Figure 4:
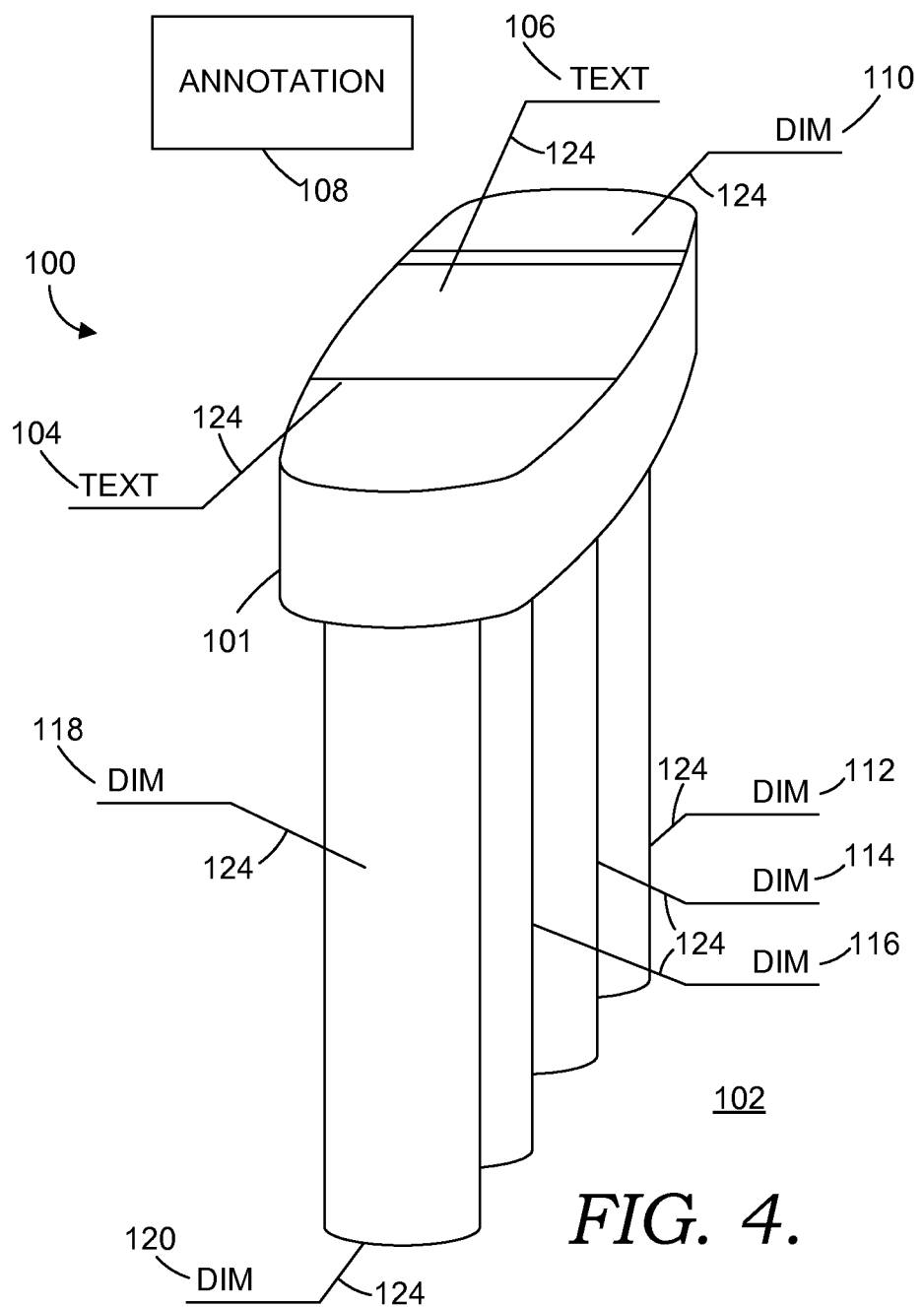
FIG. 4 depicts an illustrative changed orientation of the engineering drawing of FIG. 1 with the location of labels moved in accordance with an embodiment of the invention.

The anchor points 122 are placed on objects 101 in the engineering drawing 100 or in the drawing space 102 by a user interaction or automatically by a drafting application used to create or view the engineering drawing 100. The anchor points 122 are located at any desired location in the engineering drawing 100. For example an indication might be received from a user, such as a mouse-click indication at a particular point on an object 101 in the engineering drawing 100, to indicate a user's desire for an anchor point 122 to be generated at the indicated point. The anchor points 122 can be visually depicted as a point or a dot as depicted in FIGS. 1-3, or by any other desired symbol. Alternatively, the anchor points 122 might not be visually depicted, as shown in FIG. 4.

Predetermined and selectable points (not shown) that a user can designate as an anchor point 122 might also be provided to aid the user in identifying desirable locations for anchor points 122. For example, selectable points might be identified on objects 101 at midpoints of lines, centers of shapes, at endpoints or intersections of lines, and the like. Alternatively, a drafting application can automatically generate an anchor point upon creation of an object 101 in the engineering drawing 100. For example, the drafting application automatically generates a dimensions label displaying the dimensions of an object such as a circle, cube, or column when the object is added to the engineering drawing 100.

Each placement node 128 associated with labels 104-120 is automatically generated when a corresponding anchor point 122 is generated. In another embodiment, placement nodes 128 are not used and the labels 104-120 provide the functions thereof. Additionally, a symbol or other object may be used to depict the location of the placement nodes 128 as shown in FIGS. 1-3.

The location of each placement node 128 is also automatically calculated and identified such that a corresponding label 104-120 will not overlap another label 104-120. The location of the placement node 128 may also be automatically calculated so as not to overlap an object 101 in the engineering drawing 100. In an embodiment, a user identifies a desired location of the placement node 128. The user identified location may be adjusted such that a corresponding label 104-120 does not overlap with other labels 104-120 or an object 101 in the engineering drawing 100. In another embodiment, the labels 104-120 are allowed to overlap objects 101. In yet another embodiment, an allowable amount of overlap between labels 104-120 is designated such that labels 104-120 can overlap other labels 104-120 and/or objects 101 in the engineering drawing 100 at least partially.

A visible or nonvisible leader 124, 126 connects the anchor point 122 to the placement node 128. The visible leader 124 includes a line connecting the anchor point 122 to the placement node 128 that is visible to an observer of the engineering drawing 100. The nonvisible leader 126 is not visible to an observer of the engineering drawing 100 under ordinary viewing settings as is indicated by a dashed line in FIGS. 1 and 3, but provides a connection between the label 108 and the corresponding anchor point 122. In an embodiment, nonvisible leaders 126 are not used. The location of the placement nodes 128 may be restricted such that the visible and/or nonvisible leaders 124, 126 are not allowed to cross or overlap. Alternatively, overlap of the visible and nonvisible leaders 124, 126 may be allowed.

A user may select whether a particular label 104-120 employs a visible or nonvisible leader 124, 126 and the appearance characteristics of the leader such as for example and not limitation, the weight, color, pattern, or other appearance feature of the line. Such characteristics are designated by any methods available in the art, such as by interacting with a drop down menu or configurations page, among other methods. Characteristics of leaders 124, 126 can also be designated by the type of label 104-120 to which the leader 124, 126 corresponds. For example, as depicted in FIG. 1, text objects 104, 106 and dimension labels 110-120 are designated to include continuous, black leader lines with a three point weight, while the annotation label 108 is designated to include a nonvisible leader 126. As such, when a new label is generated on the engineering drawing 100 a predetermined leader configuration is automatically provided based on the type of label that is generated. In an embodiment, the leader lines 124, 126 and their characteristics are automatically generated with or without prior configuration by a user.

With continued reference to FIG. 1, the appearance of each label 104-120 is also configurable. A user defines the appearance of each label 104-120 individually, designates a particular appearance for each type of label 104-120, or the labels 104-120 are automatically configured. Any features or characteristics of the appearance of the labels 104-120 are configurable such as, for example and not limitation, the font, color, or style of text or numbers, and the shape, color, background or other effects of any bounding object around the text or numbers.

With additional reference now to FIG. 2, an exemplary illustration of the relationships between the labels 104-120 and the object 101 of the engineering drawing 100 are depicted. As shown in FIG. 2 the placement node 128 lies at the corner of a bounding rectangle 202 around each label 104-120 (bounding rectangles 202 for labels 104, 106, and 110-120 are not visible to an observer of the engineering drawing). In an embodiment, the placement node 128 lies at any point along the periphery, at a center point, or at any other predetermined or arbitrary point in, around, or adjacent to the bounding rectangle 202.

The bounding rectangles 202 are of a size and shape corresponding to the amount of space required to display the information provided by each respective label 104-120. In an embodiment, the bounding rectangle 202 corresponds with a visible bounding object around the label 104-120. The bounding rectangle 202 frames the text or information so as to designate an amount of space needed to display the respective label's information. In another embodiment, the bounding rectangle 202 is of a larger size so as to provide a border around the text or information displayed by the label 104-120. In a further embodiment, each of the bounding rectangles 202 is of an equal size. It is to be understood that the bounding rectangles 202 may take any desired shape and are described herein as rectangular in form for explanatory purposes only. Further, embodiments are also contemplated that do not employ bounding rectangles 202.

With continued reference to FIG. 2, connections 204 between the labels 104-120 and objects 101 are depicted in accordance with an embodiment of the invention to represent springs such as in a mass-spring relationship. The connections 204 indicate mathematical relationships between the anchor points 122 and the placement nodes 128 to determine the location of the placement nodes 128 with respect to the anchor points 122. In an embodiment, the relationships are based on physics and particle interactions. Such relationships utilize equations and laws of physics to simulate and inform the interactions between bodies.

In an embodiment the connections 204 employ a mathematical relationship using known laws of physics and particle interactions, such as mass-spring, collision avoidance, penalty-based, constraint-based, and impulse-based relationships. For example, as depicted in FIG. 2, a relationship depicting the interaction between a body of a given mass and a spring is used. The mass-spring relationship might employ the formula $F=-kx$ (Hooke's law), where F is the restoring force exerted by the spring, k is a spring constant, and x is the displacement of the end of the spring, among other mass-spring relationships known in the art. As such, a mass is designated for each of the labels 104-120 and a spring constant provided for each connection 204. Via calculations of the mass-spring relationship the displacement of the end of the spring/connection 204 or the location of the placement nodes 128 can be determined. Further, the location of the labels 104-120 is configurable by adjusting the variables in the mass-spring equation employed. In an embodiment, the connections 204 are also configurable to provide a minimum and maximum length of the connection 204.

Utilizing physics based calculations allows the connections 204 to be highly configurable. Further, such calculations can provide a realistic appearance to the interaction between bodies connected by the connections 204 and allows for animation thereof. In another embodiment, non-physics-based calculations are employed to describe the connections 204.

Additionally, as depicted in FIG. 2 two or more labels 106 and 108 include a connection 206 therebetween. The connection 206 also provides a relationship, such as a mass-spring relationship, between the two labels 106 and 108. As such, a relationship between the two labels 106 and 108 is retained when one of the labels 106, 108 is moved. Similarly to the connection 204 described above, the connection 206 uses any desired equations or laws of physics and particle interactions to instruct and configure the connection's 206 characteristics. In an embodiment, the connections 204 and 206 employ other relationships in addition to, or instead of, mass-spring relationships. Further the connection 206 may connect to the bounding rectangles 202 of the labels 106 and 108 or may connect to their respective placement nodes 128.

With additional reference now to FIG. 3, collision avoidance calculations are also employed for each of the bounding rectangles 202 (depicted in FIG. 2) of the labels 104-120. Collision avoidance calculations allow the labels 104-120 to operate as they were solid bodies that, when moved into contact with a second body, must force the second body to move out of the way, bounce off of the second body, or be stopped by the second body, among other possible interactions. As such, when a label 108 is moved to a new location about the engineering drawing 100, the location of the label 106 is automatically recalculated and moved to a new location as depicted in FIG. 3 as a result of a collision with the moved label 108 and to avoid overlapping the label 108 and objects 101 in the engineering drawing 100. Further, when the size of the label 108 is increased the location of the label 110 is also recalculated and moved to a new location so as to avoid, or as a result of, a collision with the label 108 and to avoid overlapping therewith.

The collision avoidance calculations also utilize physics-based equations and laws (e.g. transfer of kinetic energy). Thus, the interaction between bodies is again highly configurable by manipulating the variables of the equations. For example, a variable for the mass of the label 108 is given a large value while a mass variable for the label 110 is given a comparatively small value. Thus, when the label 108 is moved into collision with the label 110, the label 110 is displaced or moved to a new location as depicted in FIG. 3. Alternatively, the movement of label 110 would be limited such that when moved into collision with the label 108, the label 108 would not move or would only slightly move due to the greater mass of the label 108. Further, the objects 101 might be given a very large or infinite mass such that movement and collisions of the labels 104-120 with the engineering drawing do not cause the engineering drawing to change position. In an embodiment the labels do not interact with the engineering drawing. In another embodiment, the collision avoidance calculations are not based on physics.

Although embodiments of the invention are described with respect to mass-spring relationships and collision avoidance calculations, such is not intended to limit embodiments of the invention to these relationships. Any currently known or later identified theories or calculations for particle interactions are useable for application in embodiments of the invention, such as penalty-based, constraint-based, and impulse-based interactions. For example, calculations utilized by a physics engine (described below) for approximating the motion and interaction of solid bodies are useable in embodiments of the invention.

Turning now to FIG. 4, an illustrative image of the engineering drawing 100 depicting a changed orientation of the engineering drawing 100 and the location of labels 104-120 moved in accordance with an embodiment of the invention is described. As described previously, the engineering drawing 100 may be generated or rendered in a three-dimensional drawing space 102. The objects 101 may also be rotated about one or more axis so as to view the engineering drawing 100 from an end perspective as depicted in FIG. 4, as opposed to the more broad, side perspective depicted in FIGS. 1-3.

Upon rotation of the engineering drawing 100 the mass-spring relationships provided by the connections 204 and the collision avoidance calculations of the labels 104-120 provide for the location of the labels 104-120 to be recalculated and moved with respect to the engineering drawing 100 and with respect to each other so as to avoid overlapping the labels 104-120 or the engineering drawing 100. Further, the mass-spring relationships of the connections 204 also aid in displaying the labels 104-120 within a desired proximity and orientation to the engineering drawing 100. Additionally, the connection 206 between labels 106 and 108 retains a relationship between the labels 106 and 108. Thus, the engineering drawing 100 may be rotated, zoomed, or otherwise manipulated in any desired manner and the connections 204, 206 and the collision avoidance calculations will recalculate appropriate locations for the labels 104-120. In an embodiment, the rotation or manipulation of the engineering drawing 100 and the movement of the labels 104-120 to new locations is calculated in realtime to allow animation of the movements for presentation to a user.

Figure 5:
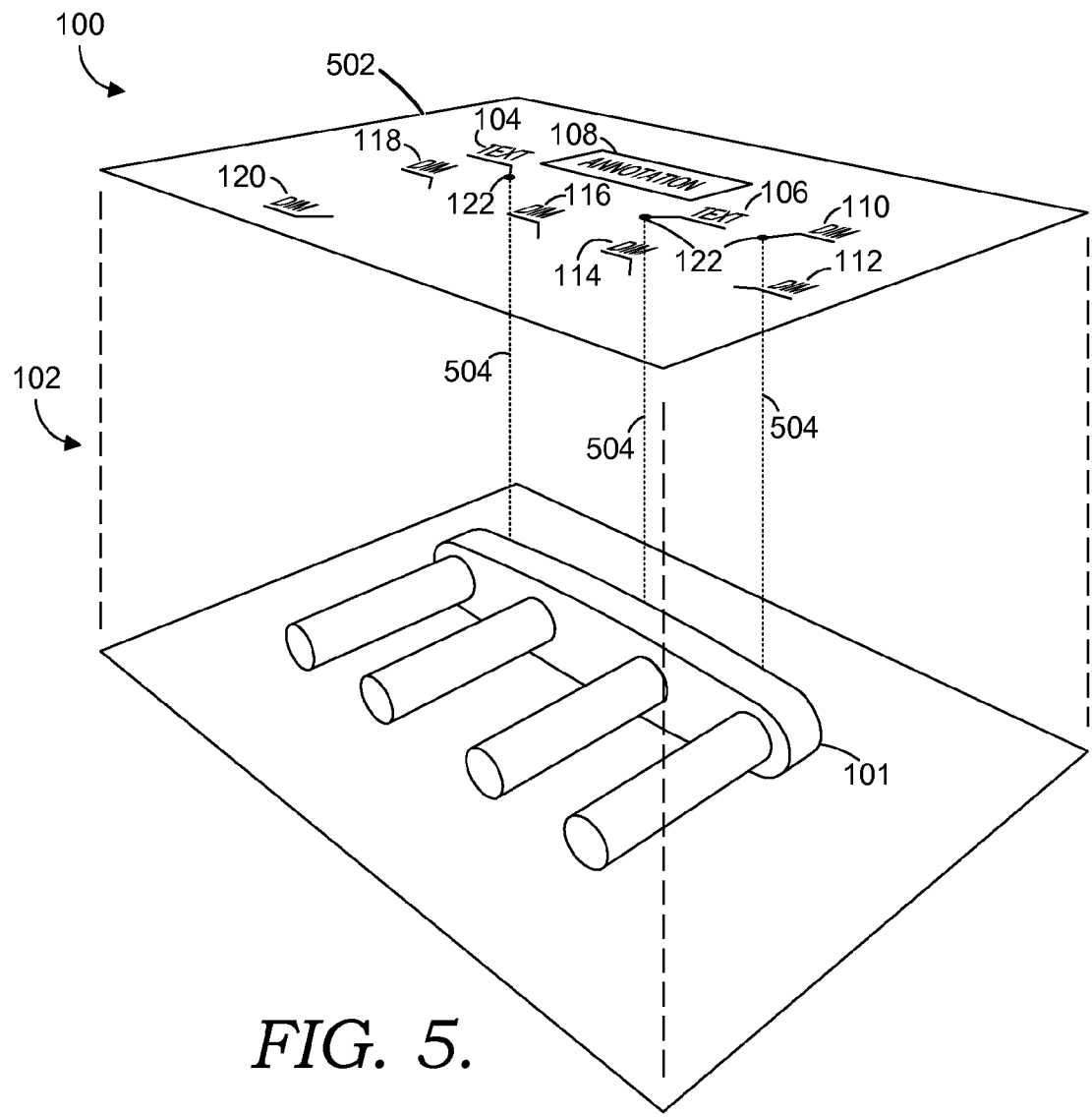
FIG. 5 depicts a label plane in a three-dimensional drawing space of an engineering drawing in accordance with an embodiment of the invention.

With reference now to FIG. 5, a perspective graphical representation of a three-dimensional drawing space of an engineering drawing depicts the three-dimensional drawing space 102 and a two-dimensional label plane 502 in accordance with an embodiment of the invention. The label plane 502 represents a theoretical two-dimensional layer placed over a theoretical three-dimensional drawing space 102 in which the objects 101 of the engineering drawing 100 are created. As depicted in FIG. 5, the objects 101 are drawn within the drawing space 102. The anchor points 122 are attached to, or associated with, the various objects 101 and are projected onto the label plane 502 as indicated by projection lines 504. (Note: only three anchor points 122 and projection lines 504 are depicted in FIG. 5 for the sake of clarity.) As such, the objects 101 are manipulated in the drawing space 102, the anchor points 122 are projected onto the label plane 502, and calculations and presentation of interactions and locations of the labels 104-120 are based in the two-dimensional label plane 502. In another embodiment, the calculations and presentation of interactions and locations of labels are based in the drawing space 102 or in both the drawing space 102 and the label plane 502.

Figure 6:
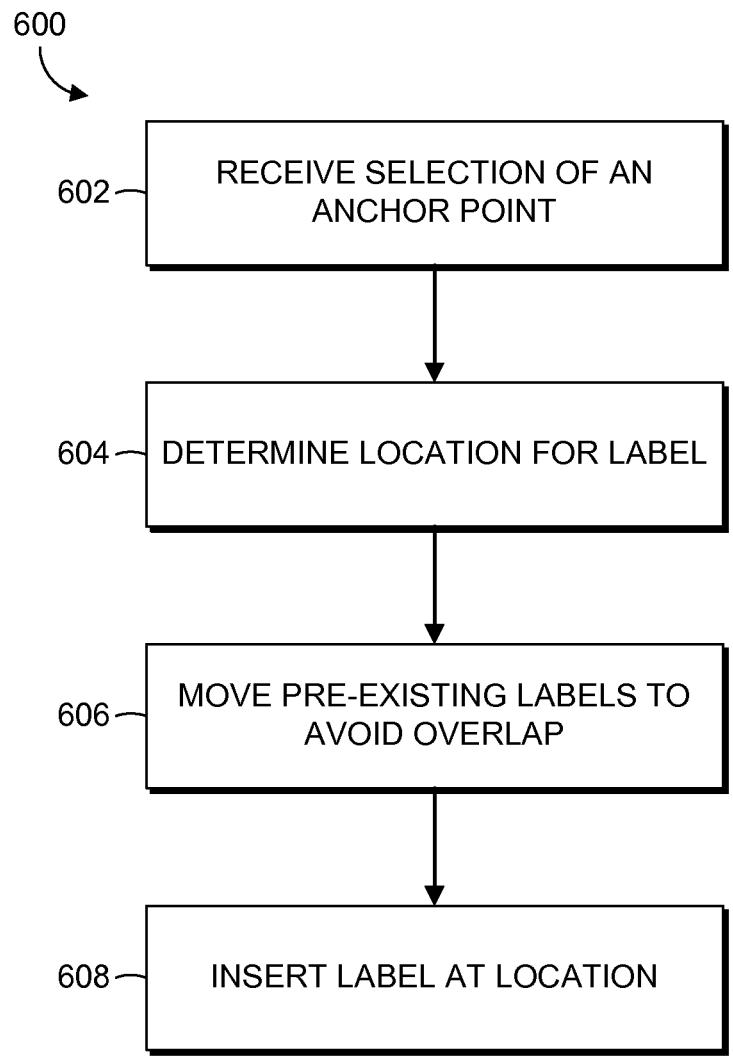
FIGS. 6-8 are flow diagrams depicting various methods for displaying information in an engineering drawing in accordance with embodiments of the invention.

With additional reference now to FIG. 6, a flow diagram depicting a method 600 for displaying information in an engineering drawing in accordance with an embodiment of the invention is described. Initially, an engineering drawing is drawn or generated by one or more users on one or more computing devices executing a drafting application as described previously. In an embodiment, the engineering drawing is generated by or in association with a building information modeling (BIM) system. A BIM system includes building modeling software that is useable to produce and manage a building model describing building geometries, spatial relationships, geographic information, and quantities and properties of building components as well as tracking and managing such information throughout the lifespan of the building. Other design or management systems such as, for example and not limitation, virtual design and construction and integrated project delivery systems might also be employed.

The engineering drawing includes one or more pre-existing labels. The pre-existing labels include one or more of a note, an annotation, a dimension, engineering information, or a callout, among a variety of other labels that might be used. Further, the pre-existing labels may have been generated by one or more users or automatically by the drafting application during generation of the engineering drawing.

At 602, a selection of an anchor point in an engineering drawing is received. The selection is received by any available method known in the art, such as for example a mouse-click indication, a stylus indication on a touch-sensitive display or pad, or a coordinate selection via a keyboard input to an input field, among a variety of others. The selection of the anchor point is a selection of any point in the engineering drawing, on an object in the engineering drawing, or in the drawing space around such objects. In an embodiment, the anchor point is selected from one or more predetermined or highlighted points in the engineering drawing.

The anchor point is associated with a new label that provides information about an object in the engineering drawing. The label may include one or more of a note, an annotation, a dimension, engineering information, or a callout, among a variety of other labels that might be used.

Upon receiving the selection of the anchor point, a location for the new label in the engineering drawing is determined, as indicated at 604. The location of the new label is identified using a placement node. The placement node identifies a location with respect to the engineering drawing at which a label is to be located and at which the label will not overlap objects in the engineering drawing. Additionally, the identified location requires that one or more pre-existing labels must be moved before inserting the label such that the label does not overlap the pre-existing labels. The determination of the position for the placement node is executed using one or more equations, formulas, or rules that instruct how and where the label can be positioned in the drawing with respect to the associated anchor point.

As described previously, the equations, formulas, or rules describe a relationship or connection between the anchor point and the placement node to determine the position of the placement node. In an embodiment, a mass-spring relationship is employed between the anchor point and the placement node. Also as described above, collision avoidance calculations are used to determine the position of the placement node. The collision avoidance calculations may apply to the placement node, an associated label, or both the placement node and the associated label.

In an embodiment, a physics engine is utilized to aid in providing the equations, formulas, and rules and the calculation thereof to determine the position of the placement node. Physics engines are known in the art for providing simulations based on equations and laws of physics to model or describe the interaction of bodies in a simulated environment. Such simulations can include collision detection systems that simulate objects as solid objects with mass and the interactions therebetween, dynamics simulations that depict the effects of forces acting on simulated objects, and fluid simulations to depict fluid interactions. Physics engine simulations may be based on one or more of penalty-based models, such as a mass-spring relationship, constraint-based models that apply constraints to estimate physical laws of nature, impulse-based models that depict the effects of impulses applied to simulated objects, or combinations of these models and others. Additionally, physics engines include sub-components that aid in animating and displaying visually the simulated objects and their interactions.

Physics engines may have an associated library of equations, laws, rules, variables, or other information useable to inform the calculations. Physics engines can provide very complex calculations that very closely approximate the interactions of bodies as they might be seen in the real world or more simplified calculations can be used to more loosely approximate such interactions. The complexity of the calculations is also configurable to control the processing power required to execute the calculations in a given amount of time. For example, in embodiments of the invention more simplified calculations of the interactions between labels and an engineering drawing might be used to provide a general approximation of their interactions such that processing power and processing time are minimized. Thereby, the processing capabilities of a user's computing device(s) are not strained and the interactions and movements of the labels can be animated without undue usage of processing power. In an embodiment of the invention, physics engines such as the open source Box2dx physics engine and library from Erin Catto are employed.

As indicated at 606, one or more of the pre-existing labels is moved to a new location to avoid overlap between the new label and the pre-existing labels and the new label is inserted at the determined location as indicated at 608. The new location for the one or more pre-existing labels is calculated based on the relationships and connections between the new label, the engineering drawing and the pre-existing labels. The new location of the pre-existing labels is calculated due to an interaction, relationship, or collision with the insertion of the new label. For example, if a relationship exists between the new label and one or more of the pre-existing labels, such as a mass-spring relationship as described above with respect to labels 106 and 108, then insertion of the new label will cause the location of a pre-existing label to be adjusted based on the relationship. Additionally, if the insertion of the new label collides with the a pre-existing label, then collision avoidance calculations employed by the physics engine will instruct movement or calculation of a new location for the pre-existing label. The new location for the pre-existing label might also be calculated such that the new label and the pre-existing labels do not overlap each other or the engineering drawing.

Figure 7:
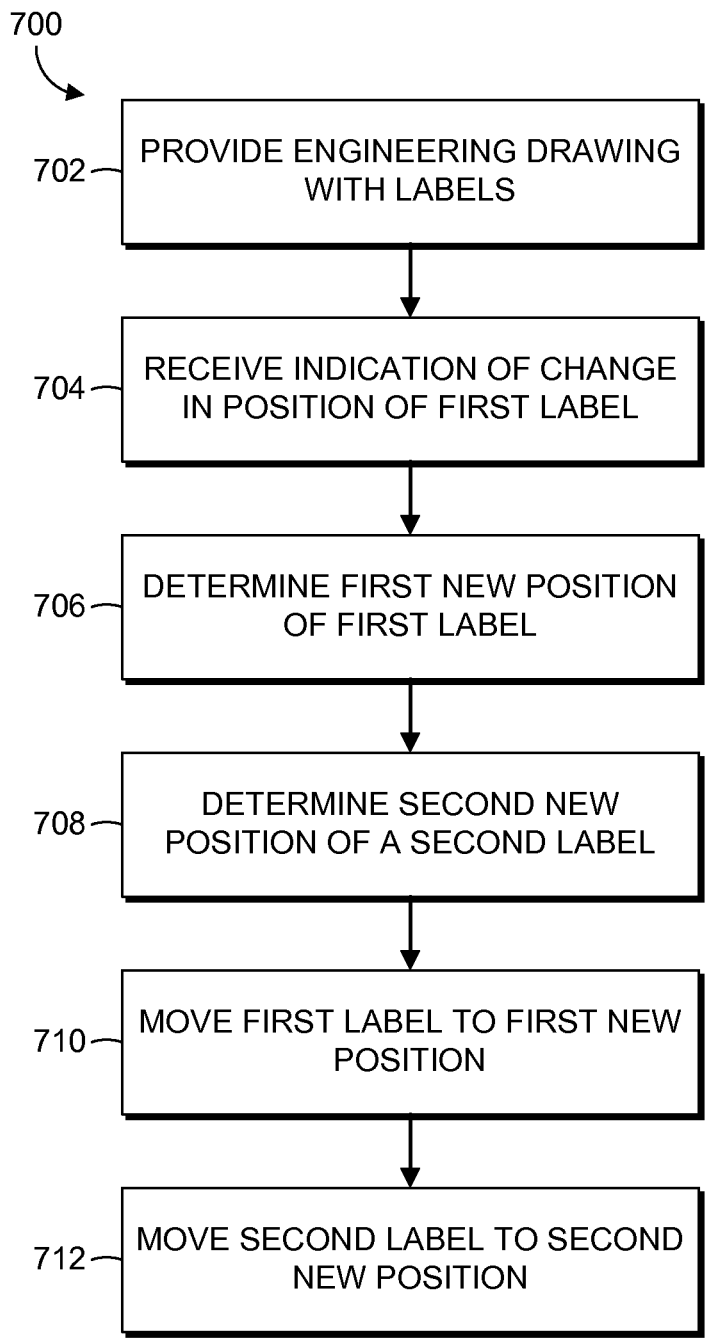

With reference to FIG. 7, a flow diagram depicting a method 700 for displaying information in an engineering drawing in accordance with an embodiment of the invention is described. At 702, an engineering drawing is provided. The engineering drawing includes one or more pre-existing labels as described previously. Each of the labels is associated with a respective anchor point and the association is described or configured by a mathematical relationship. The mathematical relationship utilizes calculations such as those provided by a physics engine to simulate interactions between the labels and with objects in the engineering drawing. Further, collision avoidance calculations are used to avoid overlap between the labels and with objects in the engineering drawing.

An indication of a change in the position of a first label from the group of pre-existing labels is received, as indicated at 704. The indication is received by any available method as described above, such as a click-and-drag indication from a mouse. A new position for the first label is determined based at least partially on the mathematical relationships that are provided between the first label and the respective anchor point, as indicated at 706. The determination of the new position may also consider a relationship between the first label and a second label from the pre-existing labels. Thus, for example and not limitation, the determination of the new position for the first label is based on a mass-spring relationship between the first label and the respective anchor point and is also based on a collision avoidance relationship between the first label and the second label from the pre-existing labels.

In an embodiment, the new location may not be the exact position indicated by the user due to the constraints placed on the positioning of the label by the relationship to the anchor point. For example, a user may drag a label away from an anchor point, but when the physics engine calculates the new location based on a mass-spring relationship between the placement node and the anchor point the new location is closer to the anchor point than indicated by the user and the label is moved to the new location. In an embodiment, indications from a user of a new position for a label override the relationships between the placement node and anchor point.

In another embodiment, the position of the label with respect to an associated placement node is also adjusted. For example, the placement node might be moved from a position along a right side of a label to a position at a lower left corner of the label such that the relationship and connection between the placement node and the anchor point are retained while providing greater freedom of placement of the label with respect thereto.

Additionally, a new position for the second label from the group of pre-existing labels is determined, as indicated at 708. The determination of the new position of the second label is necessitated by the movement of the first label interacting with the second label. For instance, the path of movement of the first label may collide with the second label and thereby the second label must move in order to avoid overlapping of the two labels. Additionally, the new position of the first label might overlap with the second label and thus, the second label must move to avoid overlap. Further still, a relationship may exist between the first label and the second label such as a mass-spring relationship or a direct link of static length such that the movement of the first label requires the second label to move in order to satisfy the relationship between the first and second labels.

At, 710 the first label is moved to the determined new position therefor, and at 712 the second label is moved to its determined new position. Thereby, the first label is moved to a new desired position without overlapping any of the remaining pre-existing labels. In an embodiment, the movement of the first and second labels to their respective new positions is animated. In another embodiment, the movement of the first label does not overlap the second label during the movement of the first label. In a further embodiment, the movements of the first and second labels do not overlap objects in the engineering drawing.

Figure 8:
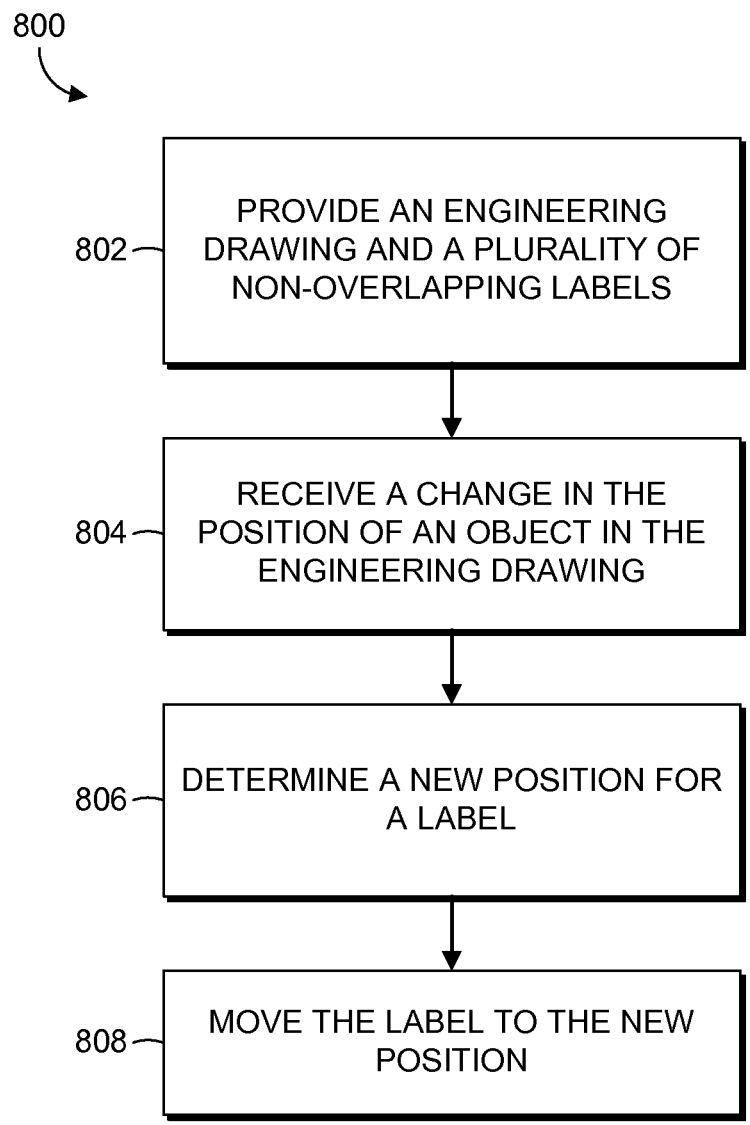

Referring now to FIG. 8, a flow diagram depicting a method 800 for displaying information in an engineering drawing in accordance with an embodiment of the invention is described. Initially, an engineering drawing with a plurality of labels attached thereto at respective anchor points is provided, as indicated at 802. Relationships are also provided between each of the labels and objects in the engineering drawing. Additional relationships may be provided between two or more of the labels. As described previously, the relationships may include mass-spring relationships as well as collision avoidance properties, among other possible relationships and enable the labels to avoid overlapping one another.

At 804, a change in the position of an object in the engineering drawing is received. The movement of the object in the engineering drawing may be indicated by any available method such as inputs from a mouse or keyboard as described above. The movement of the engineering drawing includes any change in the position of the drawing in two- or three-dimensions such as, for example changing the x or y coordinates of the engineering drawing or a portion thereof in a two-dimensional Cartesian coordinate system, or rotating the engineering drawing about one or more axis in a three-dimensional space.

With the movement of the objects in the engineering drawing the relationships between labels attached to anchor points thereon are caused to be in a non-equilibrium state. A new position for a label is determined, as indicated at 806. The new position for the label is determined as a result of a change in the state of the relationship between the label and the object in the engineering drawing to which the label is associated. The new position is calculated via a physics engine, as described previously, to determine a new location for the label at which any relationships with the objects in the engineering drawing and with other labels are satisfied and at which the label does not overlap the objects or another label.

The physics engine processes the calculations and provides the calculation information to a graphics engine which renders the labels and movements thereof on a computing device display. In an embodiment, the Windows Presentation Foundation (WPF) from Microsoft® Corporation of Redmond, Wash. and the .NET Framework development environment, also from Microsoft® Corporation are utilized to incorporate the physics engine processing and graphics engine rendering of the labels, their movements, and their interactions. However, any available physics engine, graphics engine, graphics subsystems, and frameworks may be employed in embodiments of the invention.

At 808, the label is moved to the new position. In an embodiment, new positions for more than one label are determined and the labels moved thereto. The movement of the label to the new position is also informed by the physics engine and may be displayed to a user in an animated fashion. The determination of new positions and animation of the movements thereto may be completed simultaneously and in realtime such that, as a user manipulates one or more objects in the engineering drawing, such as by rotating the objects in a three-dimensional drawing space the labels automatically move to new positions as instructed by their respective relationships while avoiding overlap therebetween.

Figure 9:
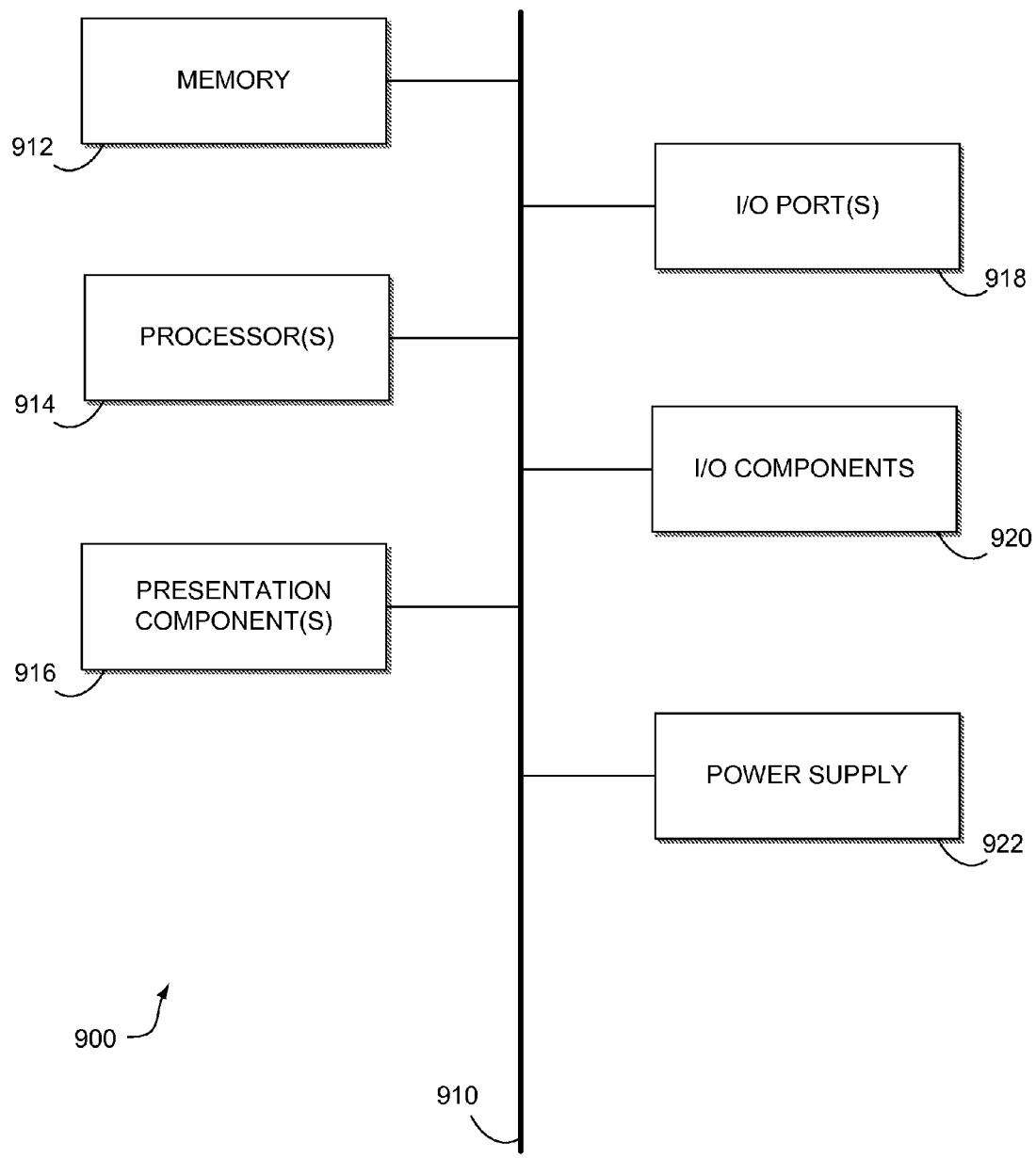
FIG. 9 is a block diagram depicting an exemplary computing device suitable for use in implementation of embodiments of the invention.

Referring now to FIG. 9 in particular, an exemplary computing device 900 suitable for use in implementation of embodiments of the invention is described. The computing device 900 is but one example of a suitable computing environment and is not intended to suggest any limitation as to the scope of use or functionality of invention embodiments. Neither should the computing device 900 be interpreted as having any dependency or requirement relating to any one or combination of components illustrated.

Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 9, a computing device 900 includes a bus 910 that directly or indirectly couples the following devices: a memory 912, one or more processors 914, one or more presentation components 916, one or more input/output ports 918, one or more input/output components 920, and an illustrative power supply 922. The bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. It is recognized that such is the nature of the art, and reiterate that the diagram of FIG. 9 is merely illustrative of an exemplary computing device 900 that can be used in connection with one or more embodiments of the present invention. Distinction is not made between such categories as "workstation," "server," "laptop," "hand-held device," etc., as all are contemplated within the scope of FIG. 9 and reference to "computing device."

The computing device 900 typically includes a variety of computer-readable media such as those described previously. By way of example, and not limitation, computer-readable media may comprises Random Access Memory (RAM); Read Only Memory (ROM); Electronically Erasable Programmable Read Only Memory (EEPROM); flash memory or other memory technologies; compact-disc read-only memory (CD-ROM), digital versatile disks (DVD) or other optical or holographic media; magnetic cassettes, magnetic tape, magnetic disk storage or other magnetic storage devices, or any other medium that can be used to encode desired information and be accessed by a computing device 900.

The memory 912 includes computer-storage media in the form of volatile and/or nonvolatile memory. The memory may be removable, nonremovable, or a combination thereof. Exemplary hardware devices include solid-state memory, hard drives, optical-disc drives, etc. The computing device 900 includes one or more processors 914 that read data from various entities such as the memory 912 or the I/O components 920. One or more of the processors 914 may comprise a physics processing unit for executing the functions of a physics engine. The presentation component(s) 916 present data indications to a user or other device. Exemplary presentation components include a display device, speaker, printing component, vibrating component, etc.

The I/O ports 918 allow the computing device 900 to be logically coupled to other devices including the I/O components 920, some of which may be built in. Illustrative components include a microphone, joystick, game pad, satellite dish, scanner, printer, wireless device, etc.

Figure 10:
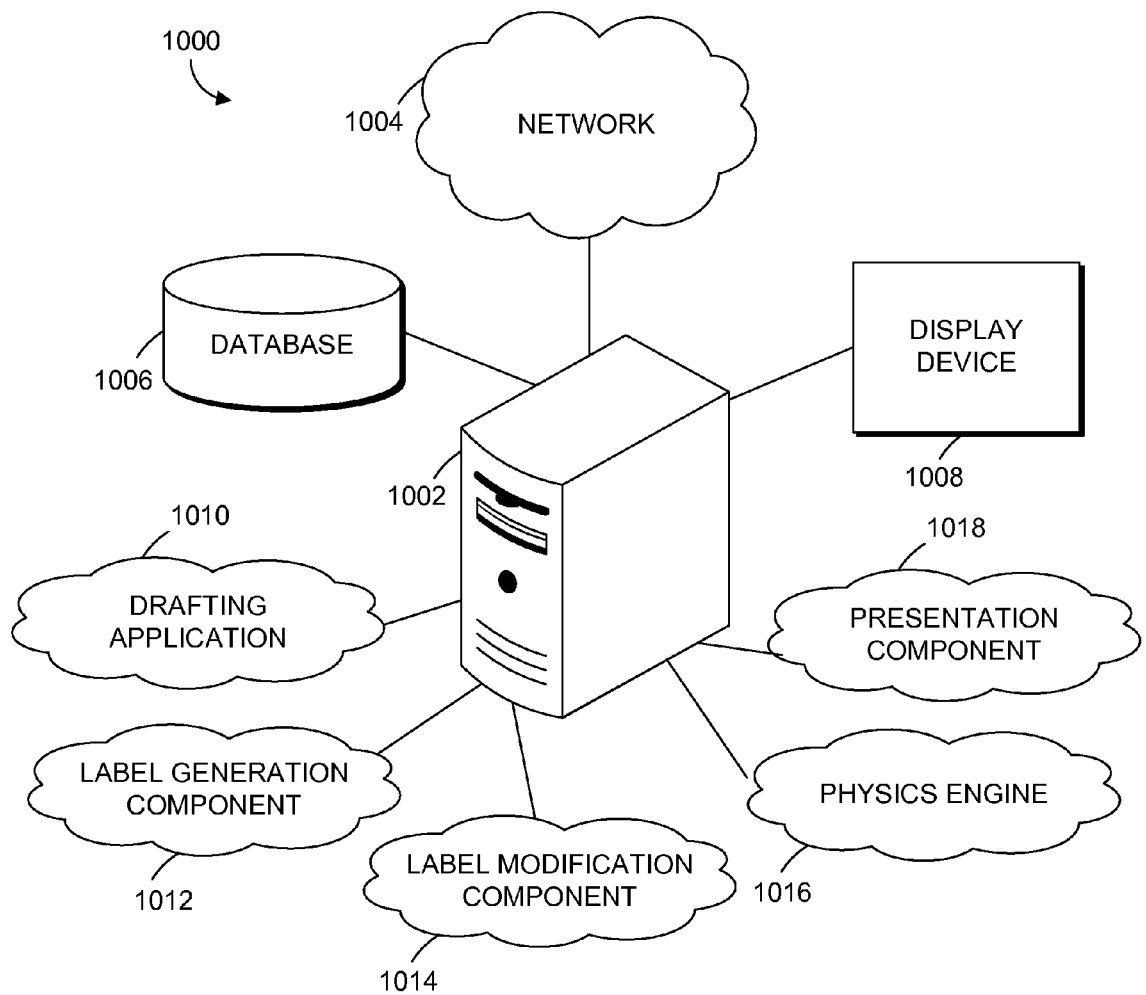
FIG. 10 is a block diagram depicting an exemplary information display system suitable for use in implementation of embodiments of the invention.

With reference to FIG. 10, a block diagram depicting an exemplary information display system 1000 for displaying information in an engineering drawing in accordance with an embodiment of the invention is described. The system includes a computing device 1002 that includes any available device in the art capable of executing a drafting application to allow a user to view or create an engineering drawing, such as the computing device 900 described above. The computing device 1002 is connected to a network 1004 such as the Internet, an intranet, an ethernet or any other public or private computing network. The computing device 1002 is also connected to one or more data stores 1006 and one or more display devices 1006.

The data store 1006 provides memory storage space to the computing device 1002 and may also provide additional processing of one or more tasks if the data store 1006 is equipped therefor. The data store 1006 is accessible directly by the computing device 1002 or may be accessible via the network 1004. The display device 1006 includes any available display device such as, for example and not limitation, a liquid-crystal display (LCD), a CRT monitor (cathode-ray tube), a plasma screen, or other display device capable of presenting an engineering drawing created on the computing device 1002 to a user.

The computing device 1002 also includes a drafting application 1010, a label-generation component 1012, a label-modification component 1014, a physics engine 1016, and a presentation component 1018. Each of the applications, components, and engines 1010-1018 are integral to the computing device 1002 or may be stored and executed remotely such as at the data store 1006 or via the network 1004. Additionally, the computing device 1002 might employ one or more additional processors either internally or remotely to aid in executing the tasks of the applications, components, and engines 1010-1018.

The drafting application 1010 comprises any available application, program, or software useable to create or view an engineering drawing. As described previously, such drafting applications 1010 include CAD applications such as, for example and not limitation, AutoCad®, Microstation®, and SolidWorks®, among others.

The label-generation component 1012 is configured to receive a selection of an anchor point on an object in engineering drawing or in a drawing space. The label-generation component 1012 also identifies, via calculations processed by the physics engine 1016, a placement node at which a label can be generated and provides the generation of the label. The identification of the placement node includes determining from the calculations processed by the physics engine 1016 where the placement node should be placed and generating the placement node at the determined location such that the placement node and an associated label comply with a relationship between the placement node and the anchor point and between the label, other labels, and the engineering drawing. In an embodiment, the placement node is identified based on a mass-spring relationship to the anchor point and by collision avoidance calculations requiring the associated label to avoid overlapping other labels and the engineering drawing.

The label-modification component 1014 is configured to receive an indication of a new location for a placement node or an indication of a change in the position of the engineering drawing. The indication is received from a user via any available method, such as a mouse click-and-drag input or from a drafting application in which the engineering drawing is being created.

The physics engine 1016 includes any available physics engine and library as described above. The physics engine 1016 provides any necessary or desired equations, rules, laws and calculations thereof to inform the relationships and connections between labels and the engineering drawing, as described previously. The physics engine 1016 may be a standalone program or application, or an integral component of the engineering drafting application 1010 or of one or more of the components 1012-1018 of the system 1000. The physics engine 1016 executes calculations, such as collision avoidance, mass-spring, penalty-based, constraint-based, and impulse-based relationship calculations to inform the movement and interaction of the labels with respect to their movements and locations in relation to each other and objects in the engineering drawing.

The calculations of the physics engine 1016 are utilized by the presentation component 1018 to generate a display on the display device 1008 of the labels in the engineering drawing. The presentation component 1018 may provide animations of the movement of the labels as such movements are described by the physics engine's 1016 calculations. The presentation component 1018 utilizes a two-dimensional label plane, such as that depicted in FIG. 5, on which to display the labels. In another embodiment, the presentation component 1018 displays labels in a three-dimensional drawing space.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media storing computer-executable instructions that, when executed, facilitate a method of arranging information presented in an engineering drawing, the method comprising:
   receiving an indication of an anchor point associated with a label, which provides information about an object in an engineering drawing, wherein the engineering drawing includes a pre-existing label;
   determining a location for the label;
   determining that the label overlaps with the pre-existing label;
   in response to determining that the label overlaps with the pre-existing label, animatedly moving the pre-existing label to a new location that does not overlap the label; and
   inserting the label at the location.

2. The media of claim 1, wherein the label and the pre-existing label does not overlap an object in the engineering drawing.

3. The media of claim 1, wherein determining a location for the label further comprises:
   calculating a mathematical relationship between the label and the anchor point.

4. The media of claim 3, wherein the mathematical relationship is one or more of a mass-spring relationship, a collision avoidance, a penalty-based relationship, a constraint-based relationship, an impulse-based relationship, or a combination thereof.

5. The media of claim 1, wherein moving the pre-existing label such that the label and the pre-existing label does not overlap further comprises:
   calculating a mathematical relationship between the label and the pre-existing labels.

6. The media of claim 5, wherein the mathematical relationship is one or more of a mass-spring relationship, a collision-avoidance relationship, a penalty-based relationship, a constraint-based relationship, an impulse-based relationship, or a combination thereof.

7. The media of claim 1, wherein the label includes one or more of a note, an annotation, a dimension, engineering information, and a callout.

8. The media of claim 1, wherein the engineering drawing is a computer aided design (CAD).

9. The media of claim 1, wherein a placement node is associated with the label, and wherein the location of the label is determined by identifying a position for the placement node.

10. The media of claim 1, wherein a physics engine is employed by the computing device to determine the location for the label and to inform movement of the pre-existing label, the physics engine providing calculation of a mathematical relationship between one or more of 1) the label and an object in the engineering drawing, 2) the label and the pre-existing label, and 3) the pre-existing label and an object in the engineering drawing.

11. Non-transitory computer-readable media having computer-executable instructions embodied thereon that, when executed, facilitate a method of arranging information presented in an engineering drawing, the method comprising:
   providing an engineering drawing with a first label and a second label, wherein the first label is associated with a first anchor point by a first mathematical relationship, and wherein the first label and the second label do not overlap one another;
   receiving an indication of a change in a position of the first label;
   based on the indication of the change in position, determining a first new position for the first label based at least partially on the first mathematical relationship between the first label and the first anchor point and on a second mathematical relationship between the first label and the second label;
   based on the indication of the change in position of the first label, determining a second new position for the second label based at least partially on the second mathematical relationship between the first label and the second label;
   automatedly moving the first label to the first new position such that the first label does not overlap any of the plurality of labels; and
   moving the second label to the second new position.

12. The media of claim 11, wherein the first mathematical relationship and the second mathematical relationship include one or more of a mass-spring relationship, a collision avoidance relationship, a penalty-based relationship, a constraint-based relationship, an impulse-based relationship, or a combination thereof.

13. The media of claim 11, wherein the associations of the first label and the second label with respective anchor points are visually indicated by a leader, and the leaders do not cross.

14. The media of claim 11, wherein the steps of determining the first new position and determining the second new position are completed in realtime.

15. The media of claim 11, wherein the labels in the plurality of labels include one or more of notes, annotations, dimensions, engineering information, and callouts.

16. Non-transitory computer-readable media having computer-executable instructions embodied thereon that, when executed, perform a method for displaying information in an engineering drawing, the method comprising:
   providing an engineering drawing including a label that is linked to an object at an anchor point and that provides information about the object, wherein the label and the object to not overlap, and wherein the label is associated with the anchor point by a mathematical relationship;
   receiving a change in a position of the object in the engineering drawing, which moves the object to a new location;
   in response to receiving the change in position of the object, determining a new position for the label based on the mathematical relationship, the new position providing a location for the label at which the label does not overlap the object positioned at the new location; and
   moving the first label to the new position by providing an animated display of the movement.

17. The media of claim 16, wherein a leader is provided between the label and the anchor point, and wherein the leader does not cross any other leader in the engineering drawing.

18. The media of claim 16, wherein determining a new position for the label includes calculating a mass-spring relationship, a collision-avoidance relationship, a penalty-based relationship, a constraint-based relationship, an impulse-based relationship, or a combination thereof.

* * * * *